United States Patent
Shan

(10) Patent No.: US 12,519,713 B2
(45) Date of Patent: Jan. 6, 2026

(54) METHOD, DEVICE, EQUIPMENT AND STORAGE MEDIUM FOR REDIRECTING EDGE NODES FOR CLIENTS

(71) Applicant: BEIJING BAIDU NETCOM SCIENCE TECHNOLOGY CO., LTD., Beijing (CN)

(72) Inventor: Tengfei Shan, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/747,058

(22) Filed: Jun. 18, 2024

(65) Prior Publication Data

US 2025/0023812 A1    Jan. 16, 2025

(30) Foreign Application Priority Data

Dec. 19, 2023    (CN) .......................... 202311753252.7

(51) Int. Cl.
*H04L 45/122* (2022.01)
*H04L 45/02* (2022.01)
*H04L 45/28* (2022.01)

(52) U.S. Cl.
CPC ............ *H04L 45/122* (2013.01); *H04L 45/02* (2013.01); *H04L 45/28* (2013.01)

(58) Field of Classification Search
CPC ....... H04L 45/122; H04L 45/02; H04L 45/28; H04L 45/7453; H04L 67/1023; H04L 67/1008; H04L 67/563
See application file for complete search history.

(56) References Cited

U.S. PATENT DOCUMENTS

| | | | | |
|---|---|---|---|---|
| 2016/0352607 | A1* | 12/2016 | Luo | ..................... H04L 41/0896 |
| 2023/0010046 | A1* | 1/2023 | Yan | ..................... H04L 67/1008 |
| 2023/0208737 | A1* | 6/2023 | Mohanty | ............... H04L 45/125 370/252 |

* cited by examiner

*Primary Examiner* — Chris Parry
*Assistant Examiner* — Dixon F Dabipi
(74) *Attorney, Agent, or Firm* — Osha Bergman Watanabe & Burton LLP

(57) ABSTRACT

A method for redirecting an edge node for a client includes: determining a peak bandwidth of a target region based on peak bandwidths of edge nodes in the target region, in which there are at least two edge nodes in the target region; determining a bandwidth ratio of each edge node based on the peak bandwidth of the target region and peak bandwidth of each edge node; obtaining a hash value of a data request address of a client request data by calculating the data request address using a preset algorithm; and determining one target edge node as an edge node of the client request data from the edge nodes of the target region based on the hash value and the bandwidth ratio of each edge node.

20 Claims, 3 Drawing Sheets

METHOD, DEVICE, EQUIPMENT AND STORAGE MEDIUM FOR REDIRECTING EDGE NODES FOR CLIENTS

CROSS-REFERENCE TO RELATED APPLICATIONS

The application is based upon and claims priority to Chinese Patent Application No. 202311753252.7 filed on Dec. 19, 2023, the entire content of which is incorporated herein by reference for all purposes.

TECHNICAL FIELD

The present disclosure relates to a field of computer technologies, and in particular relates to a method and a device for redirecting an edge node for a client, and a storage medium.

BACKGROUND

In a live streaming scenario, a client may request live streaming data from a parent node of an edge node through the edge node. Clients at different locations may request live streaming data through different edge nodes. When a plurality of edge nodes request live streaming data from the parent node, a plurality of back-to-origin bandwidths are generated in the parent node, and each back-to-origin bandwidth is returned to the corresponding edge node.

In the present art, the address of the edge node used by the client may be redirected to reduce the amount of back-to-origin bandwidths in the parent node. For example, in a case that a client requests live streaming data, the address of the edge node used by the client may be saved. In a case that another client requests the same live streaming data as the client and uses an edge node different from one used by the client, the address of the edge node used by the other client may be redirected to the address of the edge node used by that client.

SUMMARY

According to a first aspect of the present disclosure, there is provided a method for redirecting an edge node for a client. The method includes: determining a peak bandwidth of a target region based on peak bandwidths of edge nodes in the target region, in which there are at least two edge nodes in the target region; determining a bandwidth ratio of each edge node based on the peak bandwidth of the target region and peak bandwidth of each edge node; obtaining a hash value of a data request address of a client request data by calculating the data request address using a preset algorithm; and determining one target edge node as an edge node of the client request data from the edge nodes of the target region based on the hash value and the bandwidth ratio of each edge node.

According to a second aspect of the present disclosure, there is provided a device for redirecting an edge node for a client. The device includes: at least one processor; and a memory communicatively coupled to the at least one processor and storing instructions executable by the at least one processor.

The at least one processor is configured to: determine a peak bandwidth of a target region based on peak bandwidths of edge nodes in the target region, in which there are at least two edge nodes in the target region; determine a bandwidth ratio of each edge node based on the peak bandwidth of the target region and peak bandwidth of each edge node; obtain a hash value of a data request address of a client request data by calculating the data request address using a preset algorithm; and determine one target edge node as an edge node of the client request data from the edge nodes of the target region based on the hash value and the bandwidth ratio of each edge node.

According to a third aspect of the present disclosure, there is provided a non-transitory computer-readable storage medium storing computer instructions. The computer instructions are configured to cause the computer to perform a method for redirecting an edge node for a client. The method includes: determining a peak bandwidth of a target region based on peak bandwidths of edge nodes in the target region, in which there are at least two edge nodes in the target region; determining a bandwidth ratio of each edge node based on the peak bandwidth of the target region and peak bandwidth of each edge node; obtaining a hash value of a data request address of a client request data by calculating the data request address using a preset algorithm; and determining one target edge node as an edge node of the client request data from the edge nodes of the target region based on the hash value and the bandwidth ratio of each edge node.

It should be appreciated that the description in this section is not intended to identify key or important features of embodiments of the present disclosure, nor is it intended to limit the scope of the present disclosure. Other features of the present disclosure will be readily understood by the following specification.

BRIEF DESCRIPTION OF THE DRAWINGS

The accompanying drawings are used for a better understanding of the present embodiment and do not constitute a limitation of the present disclosure.

DETAILED DESCRIPTION

Figure 1:
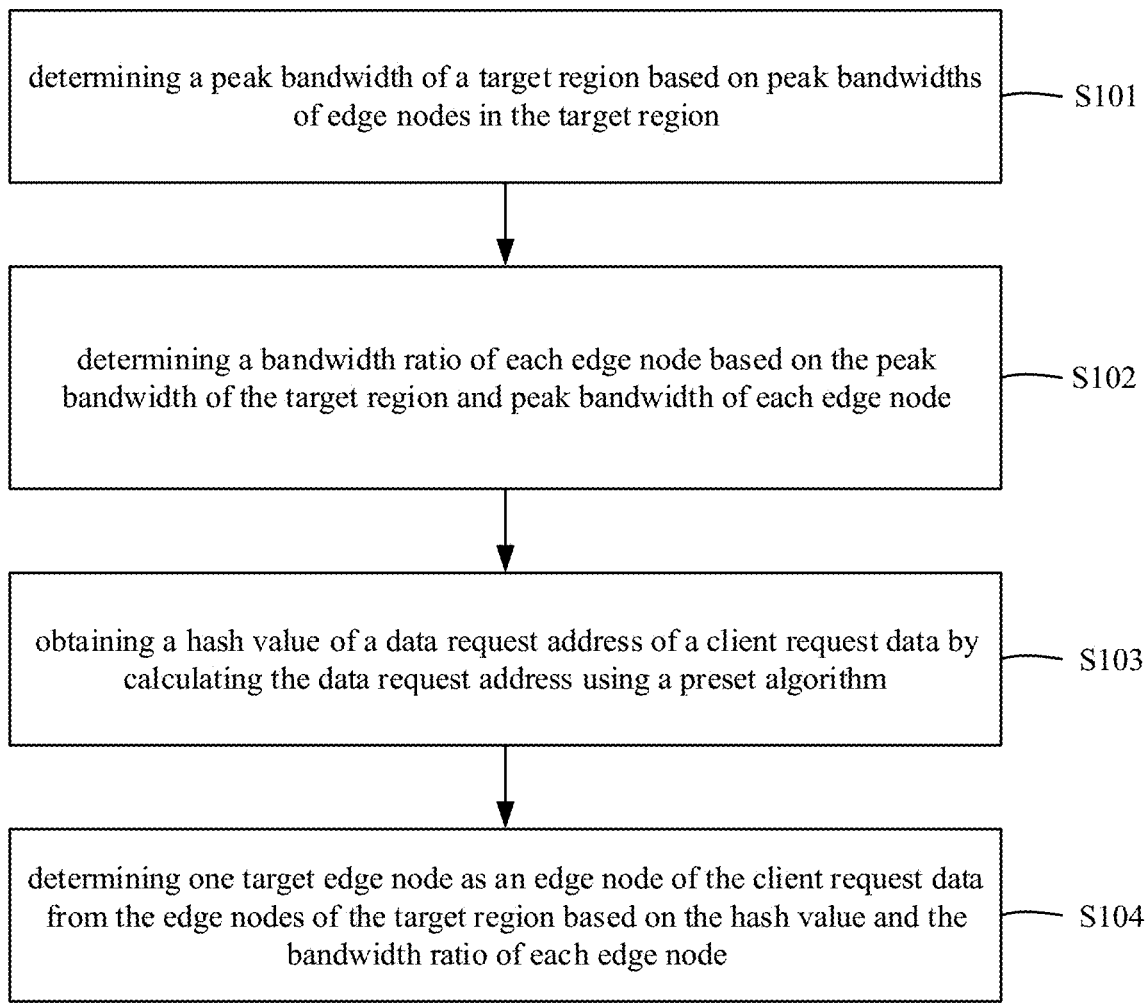
FIG. 1 is a flowchart illustrating a method for redirecting an edge node for a client according to an embodiment of the present disclosure.

Embodiments of the present disclosure are described hereinafter in conjunction with the accompanying drawings, which include various details of the embodiments of the present disclosure in order to aid in understanding, and which should be considered exemplary only. Accordingly, one of ordinary skill in the art should recognize that various changes and modifications can be made to the embodiments described herein without departing from the scope and spirit of the present disclosure. Similarly, descriptions of well-known features and structures are omitted from the following description for the sake of clarity and brevity.

It is appreciated that in embodiments of the present disclosure, the character "/" generally indicates that the associated objects before and after are in an "or" relationship. The terms "first" and "second" are used for descriptive purposes only and are not to be construed as indicating or implying relative importance or implicitly specifying the number of technical features indicated.

In a live streaming scenario, a client may request live streaming data from a parent node of an edge node through the edge node. Clients at different locations may request live streaming data through different edge nodes. When a plurality of edge nodes request live streaming data from the parent node, a plurality of back-to-origin bandwidths are generated in the parent node, and each back-to-origin bandwidth is returned to the corresponding edge node.

For example, in the live streaming scenario, an anchor side may upload the generated live streaming data to a streaming media center, the streaming media center may send the live streaming data to the parent node of the edge node, and the parent node of the edge node may send the live streaming data to the client through the edge node. After receiving the live streaming data, the client may parse and display the live streaming data on the client.

Alternatively, the parent node of the edge node may also be referred to as a center node, a parent content delivery network (CDN), a parent server, etc. The edge node may also be referred to as an edge CDN, an edge server, an edge server cluster, etc.

For example, in the case that a user is watching a live streaming through a client, the client may initiate one hypertext transfer protocol (HTTP) request to a uniform resource locator (URL) of a domain name, and the client may parse and obtain the internet protocol (IP) address of the server pointed to by the domain name through the domain name system (DNS), and may initiate an HTTP request to the IP address.

In related art, the address of the edge node used by the client may be redirected to reduce the amount of back-to-origin bandwidths in the parent node. For example, in a case that a client requests live streaming data, the address of the edge node used by that client may be saved. In a case that another client requests the same live streaming data as that client and uses an edge node different from one used by the client, the address of the edge node used by the other client may be redirected to the address of the edge node used by the client.

For example, in a live streaming scenario, the process described above of redirecting the address of the edge node used by the other client to the address of the edge node used by the client may also be referred to as live streaming redirection status code 302.

However, the method described above for redirecting the address of the edge node used by the client is not intelligent enough, and the efficiency of the redirection is not high enough.

For example, the process described above of redirecting the address of the edge node used by the other client to the address of the edge node used by the client requires comparing the edge nodes used by the other client to the edge nodes used by the client one by one. In a case of a large number of users requesting live streaming data, the number of required comparisons will be large, and thus the method described above for redirecting the address of the edge node used by the client is less efficient.

In this situation, a method for redirecting an edge node for a client is provided in the present disclosure, which can save bandwidth resource and improve the efficiency of redirecting the edge node for the client.

For example, a subject executing the method for redirecting an edge node for a client may be a computer or a server, or may also be other devices with data processing capability. The subject executing the method is not limited in the disclosure.

In some implementations, a server may be one single server, or, alternatively, a server cluster including a plurality of servers. In some implementations, the server cluster may also be a distributed cluster. The specific implementation of the server is also not limited in the present disclosure.

FIG. 1 is a flowchart illustrating a method for redirecting an edge node for a client according to an embodiment of the present disclosure. As shown in FIG. 1, the method may include steps S101 to steps S104.

At S101, a peak bandwidth of a target region is determined based on peak bandwidths of edge nodes in the target region, in which there are at least two edge nodes in the target region.

For example, the division of the target region may be based on a preset division rule, for example, the preset rule may be based on a geographic location of the target region, e.g., northeast, northwest, north China, east China, south China, southwest, etc.

Alternatively, the division of the target region may be based on a network bandwidth factor of the target region and the like. The edge node in the target region may be determined based on the existence of the edge node in the target region, or may be set in the target region according to the actual situation, and the determination form of the edge node in the target region is not specifically limited here. The peak bandwidth of the edge nodes may be determined based on a preset peak bandwidth determination method, or may be set by the user based on the actual situation, and the specific value of the peak bandwidth of the edge node in the target region is not specifically limited in the present disclosure, which may be set or updated based on the actual situation. A manner for determining the peak bandwidth of the target region based on the peak bandwidths of the edge nodes in the target region may be obtained by summing the peak bandwidths of the edge nodes in the target region or by performing a weighted sum based on the peak bandwidths of the edge nodes in the target region. The manner for determining the peak bandwidth of the target region based on the peak bandwidths of the edge nodes in the target region is not specifically limited in the present disclosure, provided that the peak bandwidth of the target region is determined based on the peak bandwidths of the edge nodes in the target limited region.

Alternatively, information of the edge node may also include operator information and protocol information used by the edge node. For example, the operator of the edge node A may be China mobile, and the protocol information used by it may be the internet protocol version 4 (IPV4), or the operator of the edge node A may be China Unicom, and the protocol information used by it may be the internet protocol version 6 (IPV6), which is not limited in the present disclosure.

For example, based on the geographic location of the target region, the target region may be divided into a region A, and the region A may include two edge nodes: edge node A in which the peak bandwidth may be 50 GB; edge node B in which the peak bandwidth may be 150 GB; and the peak bandwidth of the target region determined based on edge node A and edge node B may be 200 GB.

At S102, a bandwidth ratio of each edge node is determined based on the peak bandwidth of the target region and peak bandwidth of each edge node.

For example, the bandwidth ratio of each edge node may be determined based on a ratio of the peak bandwidth of each edge node to the peak bandwidth of the target region, or may be determined based on a ratio of the peak bandwidth of each edge node multiplied by corresponding weighting information to the peak bandwidth of the target region. The manner for determining the bandwidth ratio of each edge node is not specifically limited in the present disclosure.

For example, in a case that the bandwidth ratio of each edge node is determined based on a ratio of the peak bandwidth of each edge node to the peak bandwidth of the target region. The peak bandwidth of edge node A may be 50 GB, the peak bandwidth of edge node B may be 150 GB, and the peak bandwidth of the target region determined based on edge node A and edge node B may be 200 GB. The determined bandwidth ratio of edge node A may be 25%, and the bandwidth ratio of edge node B may be 75%.

At S103, a hash value of a data request address of a client request data is obtained by calculating the data request address using a preset algorithm.

For example, the preset algorithm may be a cyclic redundancy check (CRC) algorithm, a hash function (Fowler-Noll-Vo, FNV-1) algorithm, a derivative algorithm of the hash function (Fowler-Noll-Vo-A, FNV-1A), etc., and the preset algorithm is not specifically limited in the present disclosure. The data request address of the client request data may be an address of a live streaming room that the user watching the live streaming wants to request.

For example, the data request address of the client request data may be address A. A CRC algorithm is performed on address A to obtain a hash value 45864168 corresponding to address A.

At S104, one target edge node is determined as an edge node of the client request data from the edge nodes of the target region based on the hash value and the bandwidth ratio of each edge node.

For example, a manner for determining a target edge node as an edge node of the client request data from the edge nodes of the target region based on the hash value and the bandwidth ratio of each edge node, may be that a remainder is first obtained by dividing the hash value by the preset threshold, and then the target edge node may be determined based on the remainder and the ratio of each edge node, or, the hash value may be analyzed directly to determine the target edge node based on the analysis result. For example, the preset threshold can be 100 or 1000, and the size of the preset threshold may be set according to the actual situation. The hash value is divided by the preset threshold to obtain the remainder, and the target edge node may be determined based on the size of the remainder and the bandwidth ratio of each edge node, for example, the edge node with the bandwidth ratio closest to the remainder may be selected as the target edge node, or, the edge nodes are sorted based on the bandwidth of each edge node and the bandwidth ratios of the first K edge nodes in the sorting result are summed, and a K-th edge node may be determined as the target node in case the sum of the bandwidth ratios is greater than or equal to the remainder at the first time.

For example, the preset threshold may be 100, the hash value may be 45864168, the remainder obtained by dividing the hash value by the preset threshold may be 68, the bandwidth ratio of edge node A may be 25%, and the bandwidth ratio of edge node B may be 75%. As an example, the manner for determining the target edge node is selecting the edge node with the bandwidth ratio closest to the remainder as the target edge node, the determined target edge node may be edge node B.

For example, the preset threshold may be 100, the hash value may be 45864168, the remainder obtained based on dividing the hash value by the preset threshold may be 68, the bandwidth ratio of the edge node A may be 25%, and the bandwidth ratio of the edge node B may be 75%. As an example, the manner for determining the target edge node is, sorting the edge nodes based on the bandwidth of each edge node, summing the bandwidth ratios of the first K edge nodes in the sorting result, and determining a K-th edge node as the target node in a case that the sum of the bandwidth ratios is greater than or equal to the remainder at the first time. The sorting result obtained by sorting the edge nodes in an ascending order may be: edge node A, edge node B. When the sum of the bandwidth ratios is greater than or equal to the remainder for the first time, the value of K may be 2, and the determined target edge node may be edge node B.

In the present disclosure, the peak bandwidth of the target region is determined based on peak bandwidths of edge nodes in the target region, in which there are at least two edge nodes in the target region; the bandwidth ratio of each edge node is determined based on the peak bandwidth of the target region and peak bandwidth of each edge node; the hash value of the data request address of the client request data is obtained by calculating the data request address using the preset algorithm; and one target edge node is determined as the edge node of the client request data from the edge nodes of the target region based on the hash value and the bandwidth ratio of each edge node. The target edge node may be determined quickly and accurately based on the hash value corresponding to the data request address, thus redirecting all of the clients of the same data request address to the target edge node, and using the same target edge node for data transmission, reducing the back-to-origin bandwidth of the parent node, and thus saving bandwidth resources, and improving the efficiency of redirecting the edge node for the client.

In some embodiments, the target region includes at least two sub regions, and the client is located in a first sub region of the sub regions, and the data request address of the client request data is directed to an edge node in the first sub region.

For example, the data request address of the client request data being directed to an edge node in the first sub region may be that, when the client is located in the first sub region and the client is requesting data, a DNS server in the first sub region may direct the data request address of the client request data to an edge node in the first sub region.

For example, the target region may include two sub regions, which are sub region A and sub region B. The client may be located in sub region A, and when the client requests data, the data request address is directed to the edge node in the sub region A by the DNS server in the sub region A.

In an embodiment of the present disclosure, the target region includes at least two sub regions, and the client is located in a first sub region of the sub regions, and the data request address of the client request data is directed to an edge node in the first sub region, the data request address may be directed to the edge node of the sub region in which the client is located through the location of the sub region in which the client is located, which can improve the data transmission efficiency and reduce the delay of data transmission, improving the user's experience when requesting data.

In some embodiments, before step S101 in FIG. 1, the method for redirecting an edge node for a client may further includes: determining edge nodes in the target region based on edge nodes in the sub regions.

For example, the target region may include at least two sub regions. The edge nodes in the target region may be determined based on the edge nodes in the sub regions.

For example, the target region may be a region 1, the region 1 may include a sub region 1, a sub region 2, a sub region 3; the sub region 1 may include an edge node 1, an edge node 2; the sub region 2 may include an edge node 3; the sub region 3 may include an edge node 4, an edge node 5. Based on the edge nodes in the sub regions, the determined edge nodes in the target region may be the edge node 1, the edge node 2, the edge node 3, the edge node 4, and the edge node 5.

In an embodiment of the present disclosure, by determining the edge nodes in the target region based on the edge nodes in the sub regions, the accuracy and efficiency of the edge nodes in the target region can be improved, the bandwidth requirement and cost of the target region can be reduced, and the stability and security of the system can be improved.

In some embodiments, before step S101 in FIG. 1, in a case that the different sub regions contain same edge nodes, the method further includes: merging the different sub regions into a same target region.

For example, the target region may be a region 1 and a region 2; the region 1 may include a sub region 1 and a sub region 2, in which the sub region 1 may include an edge node 1 and an edge node 2, and the sub region 2 may include an edge node 3; the region 2 includes a sub region 3, in which the sub region 3 may include the edge node 4 and an edge node 5. The sub region 1 in the region 1 includes the edge node 1, and the sub region 3 in the region 2 includes the edge node 1. The different sub regions 1 and 3 include the same edge node, and the sub region 1 and sub region 3 may be merged into a same target region, which may be the region 1 or the region 2.

In an embodiment of the present disclosure, when the different sub regions contain the same edge node, the different sub regions are merged into the same target region. Therefore, when the different sub regions contain the same edge node, an accurate edge node in the target region may be determined, which can further improve the accuracy and efficiency of the accurate edge node in the target region, reduce the bandwidth requirement and cost of the target region, and improve the stability and security of the system.

In some embodiments, before step S101 in FIG. 1, in a case that a distance between geographic locations of the different sub regions is less than a preset distance threshold, the method for redirecting the edge node for the client further includes: merging the different sub regions into a same target region.

For example, the size of the preset distance threshold may be set based on the actual situation, which is not specifically limited in the present disclosure.

Alternatively, in a case that a distance between geographic locations of the different sub regions is equal to a preset distance threshold, the different sub regions may be merged into the same target region, or the different sub regions may not be merged into the same target region, which may be set according to the actual situation and is not specifically limited in the present disclosure.

For example, the preset distance threshold may be 500 KM, the target regions may include a region 1 and a region 2; the region 1 may include a sub region 1, and the region 2 may include a sub region 2; and the geographic location distance between the sub region 1 and the sub region 2 is 400 KM. In this case, the sub region 1 and the sub region 2 may be merged into the same target region, which may be the region 1, or the region 2, and is not specifically limited in the present disclosure.

In the present embodiment, in a case that a distance between geographic locations of the different sub regions is less than a preset distance threshold, the different sub regions are merged into the same target region, and an accurate edge node in the target region can be determined, the accuracy and efficiency of the accurate edge node in the target region can be further improved, the bandwidth requirement and cost of the target region can be reduced, and the stability and security of the system can be improved.

Figure 2:
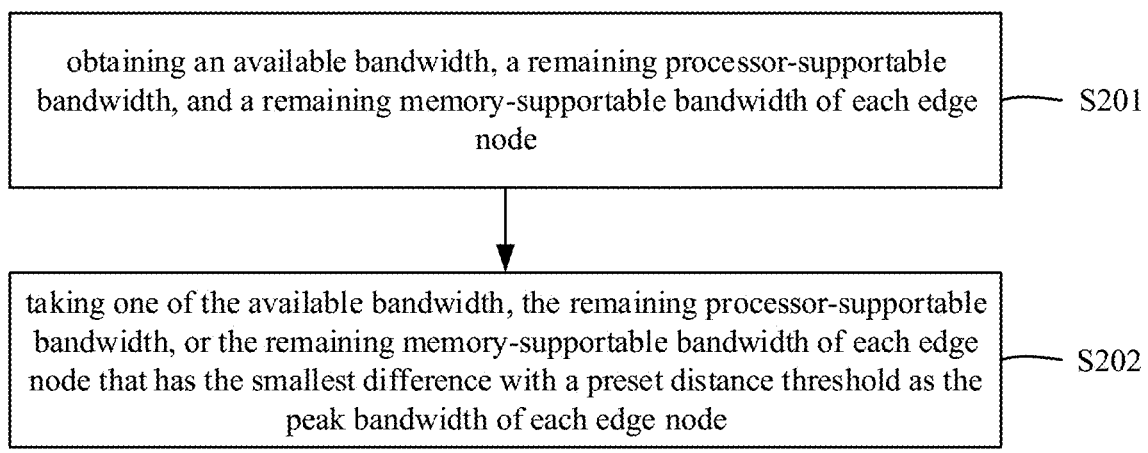
FIG. 2 is a flowchart illustrating a method for redirecting an edge node for a client according to an embodiment of the present disclosure.

FIG. 2 is a flowchart illustrating a method for redirecting an edge node for a client according to an embodiment of the present disclosure. As shown in FIG. 2, before step S101 in FIG. 1, the method for redirecting an edge node for a client may further include steps S201 to steps S202.

At S201, an available bandwidth, a remaining processor-supportable bandwidth, and a remaining memory-supportable bandwidth of each edge node are obtained.

At S202, one of the available bandwidth, the remaining processor-supportable bandwidth, or the remaining memory-supportable bandwidth of each edge node that has the smallest difference with a preset distance threshold is taken as the peak bandwidth of each edge node.

For example, the available bandwidth of the edge node may be the bandwidth of the edge node that is currently available for data transmission when the edge node is performing data transmission. The remaining processor-supportable bandwidth of the edge node may be a maximum data processing and transmission bandwidth currently supportable by the node. A remaining memory-supportable bandwidth of the edge node may be a maximum bandwidth supportable by the currently available memory resource of the edge node for data transmission and processing.

Alternatively, the preset bandwidth threshold may be set according to the actual situation, which is not specifically limited in the present disclosure.

For example, the preset bandwidth threshold may be 100 GB, the available bandwidth of the edge node may be 50 GB, the remaining processor-supportable bandwidth may be 90 GB, and the remaining memory-supportable bandwidth may be 60 GB. Thus, the remaining processor-supportable bandwidth of the edge node may be taken as the peak bandwidth of the edge node.

In the present embodiment, by obtaining the available bandwidth, the remaining processor-supportable bandwidth, and the remaining memory-supportable bandwidth of each edge node; and taking one of the available bandwidth, the remaining processor-supportable bandwidth, or the remaining memory-supportable bandwidth of each edge node that has the smallest difference with a preset distance threshold as the peak bandwidth of each edge node, the resource and scheduling of edge nodes can be optimized and the resources of edge nodes can be reasonably allocated.

Figure 3:
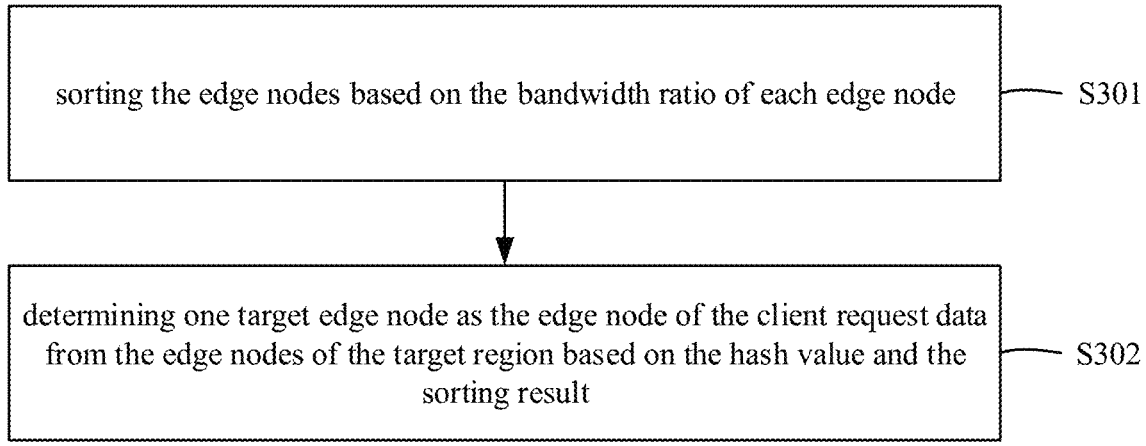
FIG. 3 is a flowchart illustrating a method for redirecting an edge node for a client according to an embodiment of the present disclosure.

FIG. 3 is a flowchart illustrating a method for redirecting an edge node for a client according to an embodiment of the present disclosure. As shown in FIG. 3, step S104 in FIG. 1 may further include steps S301 to steps S302.

At S301, the edge nodes are sorted based on the bandwidth ratio of each edge node.

At S302, one target edge node is determined as the edge node of the client request data from the edge nodes of the target region based on the hash value and the sorting result.

For example, the edge nodes may be sorted in an ascending order or in a descending order based on a bandwidth ratio of each edge node, which is not specifically limited in the present disclosure. As an example of sorting the edge nodes in an ascending order, according to the sorting result, the bandwidth ratios of first K edge nodes in the sorting result are summed, and when the sum of the K bandwidth ratios is greater than or equal to the remainder at the first time, the K-th edge node may be determined as the target node. The manner for determining one target edge node as an edge node of the client request data from the edge nodes of the target region based on the hash value and the bandwidth ratio of each edge node may be that, a remainder is first obtained by dividing the hash value by the preset threshold, and then the target edge node may be determined based on the remainder and the ratio of each edge node, or, the hash value may be directly analyzed, and the target edge node may be determined based on the analysis result.

For example, the manner for determining one target edge node as an edge node of the client request data from the edge nodes of the target region based on the hash value and the bandwidth ratio of each edge node is that a remainder is first obtained by dividing the hash value by the preset threshold, and then the target edge node may be determined based on the remainder and the ratio of each edge node. The remainder obtained by dividing the hash value by the preset threshold may be 88, the bandwidth ratio of the edge node A may be 25%, and the bandwidth ratio of the edge node B may be 75%, and the obtained sorting result may be: edge node A, edge node B. The edge nodes are sorted in an ascending order, and when the sum of the bandwidth ratios is greater than or equal to the remainder for the first time, the value of K may be 2, and the determined target edge node may be edge node B.

In an embodiment of the present disclosure, the edge nodes are sorted based on the bandwidth ratio of each edge node, and, one target edge node is determined as an edge node of the client request data from the edge nodes in the target region based on the hash value and the sorting result. The bandwidth contribution of each edge node can be more accurately assessed, the target edge node that meets the demand can be determined, the load of each edge node can be more finely calculated, the efficiency of the data transmission can be optimized, and the utilization of the edge node can be improved.

Figure 4:
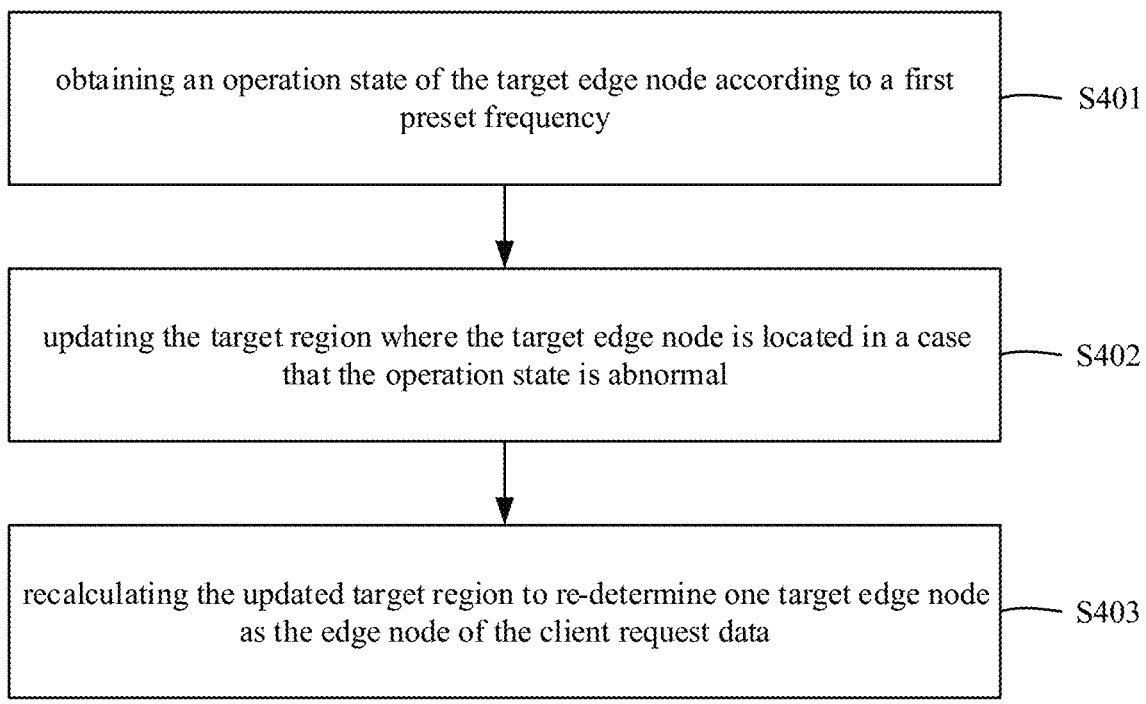
FIG. 4 is a flowchart illustrating a method for redirecting an edge node for a client according to an embodiment of the present disclosure.

FIG. 4 is a flowchart illustrating a method for redirecting an edge node for a client according to an embodiment of the present disclosure. As shown in FIG. 4, the method for redirecting an edge node for a client may further include steps S401 to steps S403.

At S401, an operation state of the target edge node is obtained according to a first preset frequency.

At S402, the target region where the target edge node is located is updated in a case that the operation state is abnormal.

For example, the size of the first preset frequency may be set according to the actual situation, which is not specifically limited in the present disclosure. For example, the first preset frequency may be once per minute, once per five minutes, etc. The operation state of the target edge node may include: whether the bandwidth of the edge node is fully utilized or not, whether the processor bandwidth of the edge node is fully utilized or not, whether the memory bandwidth of the edge node is fully utilized or not, whether the edge node stops working or not, etc., and the operation state of the edge node is not specifically limited in the present disclosure. The abnormal operation state may be that the bandwidth of the edge node is fully utilized, the processor bandwidth of the edge node is fully utilized, the memory bandwidth of the edge node is fully utilized, and the edge node stops working. Updating the target region in which the target edge node is located may be removing the abnormal target edge node from the target region, or replacing the abnormal target edge node in the target region with a new edge node.

For example, the first preset frequency may be once per minute, and the target region where the target edge node is located is updated in a case that the obtained operation state of the target edge node is that the edge node stops working. For example, the manner for updating the target region where the target edge node is located is removing the abnormal target edge node from the target region, the target region may be a region 1, and the region 1 may contain an edge node 1, an edge node 2, and an edge node 3, in which the target edge node may be the edge node 3. In a case that the obtained operation state of the edge node 3 is that the edge node 3 stops working, the edge node 3 is removed from the region 1.

At S403, the updated target region is recalculated to re-determine one target edge node as the edge node of the client request data.

For example, the edge nodes in the updated target region are all edge nodes without abnormality, and the target edge nodes of the target region may be recalculated according to steps S101 to steps S104 to re-determine one target edge node as the edge node of the client request data.

For example, the target region may be a region 1, and the region 1 may contain an edge node 1, an edge node 2, and an edge node 3, in which the target edge node may be an edge node 3. In a case that an obtained operation state of the edge node 3 is that the edge node 3 stops working, the edge node 3 is removed from the region 1. The target region after removing may include the edge node 1 and the edge node 2, and the target edge node of the target region may be recalculated according to steps S101 to steps S104, so as to re-determine one target edge node as the edge node of the client request data.

In the present embodiment, an operation state of the target edge node is obtained according to a first preset frequency, the target region where the target edge node is located is updated in a case that the operation state is abnormal, the updated target region is recalculated to re-determine one target edge node as the edge node of the client request data. The operation state of the target edge node may be obtained in time, so as to update the target edge node in time in a case that the operation state of the target edge node is abnormal, ensuring the normal operation of the target edge node.

In some embodiments, the method for redirecting the edge node for the client further includes: removing an abnormal target edge node from the target region, or replacing the abnormal target edge node in the target region with a new edge node.

For example, removing the abnormal target edge node from the target region may be shutting off, or disconnecting, the abnormal target edge node. Replacing the abnormal target edge node in the target region with a new edge node may be adding a new edge node in the target region in place of the abnormal edge node, or, reselecting one edge node in the target region in place of the abnormal edge node.

For example, the target region may be a region 1, and the region 1 may contain an edge node 1, an edge node 2, and an edge node 3, in which the abnormal target edge node may be the edge node 3. Removing the abnormal target edge node from the target region may be shutting off the edge node 3.

After shutting off the edge node 3, the edge nodes in the region 1 may be the edge node 1 and the edge node 2. Replacing the abnormal target edge node in the target region with a new edge node may be using the edge node 4 in place of the edge node 3 as the target edge node, or, reselecting one edge node in place of the edge node 3 between the edge node 1 and the edge node 2 in the region 1.

In the present embodiment, by removing an abnormal target edge node from the target region, or replacing the abnormal target edge node in the target region with a new edge node, the target edge node may be updated in time to ensure the normal operation of the target edge node, and to improve the stability of the target region to perform data transmission.

In some embodiments, step S104 in FIG. 1 may include: determining one target edge node as the edge node of the client request data from the edge nodes of the target region, based on a remainder obtained by dividing the hash value by a preset threshold and the bandwidth ratio of each edge node.

For example, the explanatory description of the present embodiment may refer to the explanatory description of step S104, which is not repeated herein.

In the present embodiment, one target edge node is determined as the edge node of the client request data from the edge nodes of the target region, based on a remainder obtained by dividing the hash value by a preset threshold and the bandwidth ratio of each edge node. The target edge node may be determined quickly and accurately based on the remainder obtained by dividing the hash value corresponding to the data request address by the preset threshold, thus redirecting all of the clients of the same data request address to the target edge node, and using the same target edge node for data transmission, reducing the back-to-origin bandwidth of the parent node, and thus saving bandwidth resources, and improving the efficiency of redirecting the edge node for the client.

In some embodiments, the preset algorithm including at least one of: a cyclic redundancy check algorithm, a hash function algorithm, or a hash function derived algorithm.

For example, the preset algorithm may be a cyclic redundancy check (CRC) algorithm, a hash function (Fowler-Noll-Vo, FNV-1) algorithm, a hash function derived algorithm (Fowler-Noll-Vo-A, FNV-1A), etc., and the preset algorithm is not specifically limited in the present disclosure. The data request address of the client request data may be calculated through the preset algorithm to obtain the hash value of the data request address.

In the present embodiment, the preset algorithm including at least one of: a cyclic redundancy check algorithm, a hash function algorithm, a hash function derived algorithm, which may protect the integrity and uniqueness of the data request address, and thus improving the security of the data transmission.

Figure 5:
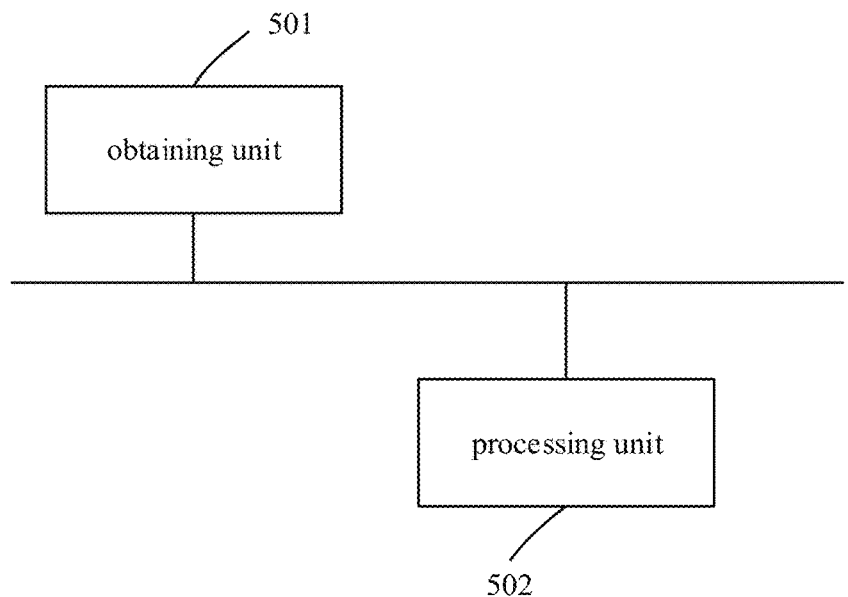
FIG. 5 is a structural diagram of an apparatus for redirecting an edge node for a client according to an embodiment of the present disclosure.

In embodiments of the present disclosure, there is provided an apparatus for redirecting an edge node for a client, which may be configured to implement the methods for redirecting an edge node for a client described in the foregoing embodiments. FIG. 5 is a structural diagram of an apparatus for redirecting an edge node for a client according to an embodiment of the present disclosure. As shown in FIG. 5, the apparatus includes: an obtaining unit 501 and a processing unit 502.

The obtaining unit 501 is configured to determine a peak bandwidth of a target region based on peak bandwidths of edge nodes in the target region, in which there are at least two edge nodes in the target region; and determine a bandwidth ratio of each edge node based on the peak bandwidth of the target region and peak bandwidth of each edge node.

The processing unit 502 is configured to obtain a hash value of a data request address of a client request data by calculating the data request address using a preset algorithm; and determine one target edge node as an edge node of the client request data from the edge nodes of the target region based on the hash value and the bandwidth ratio of each edge node.

Alternatively, the target region includes at least two sub regions, and the client is located in a first sub region of the sub regions, and the data request address of the client request data is directed to an edge node in the first sub region.

Alternatively, before determining the peak bandwidth of the target region based on the peak bandwidths of the edge nodes in the target region, the obtaining unit 501 is further configured to: determine the edge nodes in the target region based on edge nodes in the sub regions.

Alternatively, in a case that the different sub regions contain same edge nodes, the obtaining unit 501 is further configured to: merge the different sub regions into a same target region.

Alternatively, in a case that a distance between geographic locations of the different sub regions is less than a preset distance threshold, the obtaining unit 501 is further configured to: merge the different sub regions into a same target region.

Alternatively, before determining the peak bandwidth of the target region based on the peak bandwidths of the edge nodes in the target region, the obtaining unit 501 is further configured to: obtain an available bandwidth, a remaining processor-supportable bandwidth, and a remaining memory-supportable bandwidth of each edge node; and take one of the available bandwidth, the remaining processor-supportable bandwidth, or the remaining memory-supportable bandwidth of each edge node that has the smallest difference with a preset distance threshold as the peak bandwidth of each edge node.

Alternatively, the processing unit 502 is further configured to: sort the edge nodes based on the bandwidth ratio of each edge node; and determine one target edge node as the edge node of the client request data from the edge nodes of the target region based on the hash value and the sorting result.

Alternatively, the processing unit 502 is further configured to: obtain an operation state of the target edge node according to a first preset frequency; update the target region where the target edge node is located in a case that the operation state is abnormal; and recalculate the updated target region to re-determine one target edge node as the edge node of the client request data.

Alternatively, the processing unit 502, is further configured to: remove an abnormal target edge node from the target region, or replace the abnormal target edge node in the target region with a new edge node.

Alternatively, the processing unit 502, is further configured to: determine one target edge node as the edge node of the client request data from the edge nodes of the target region, based on a remainder obtained by dividing the hash value by a preset threshold and the bandwidth ratio of each edge node.

Alternatively, the preset algorithm includes at least one of: a cyclic redundancy check algorithm, a hash function algorithm, or a hash function derived algorithm.

The acquisition, storage, and application of the user's personal information involved in the technical solution of the present disclosure are in compliance with relevant laws and regulations, and do not violate public order and morals.

In embodiments of the present disclosure, an electronic device, a readable storage medium, and a computer program product are also provided.

In an embodiment, the electronic device includes: at least one processor; and a memory communicatively coupled to the at least one processor. The memory stores instructions executable by the at least one processor, and the instructions are executed by the at least one processor to cause the at least one processor to perform the methods according to the above embodiments.

In an embodiment, the readable storage medium may be a non-transitory computer-readable storage medium storing computer instructions, in which the computer instructions are configured to cause the computer to perform the methods according to the above embodiments.

In an embodiment, the computer program product includes a computer program that, when executed by a processor, implements the methods according to the above embodiments.

Figure 6:
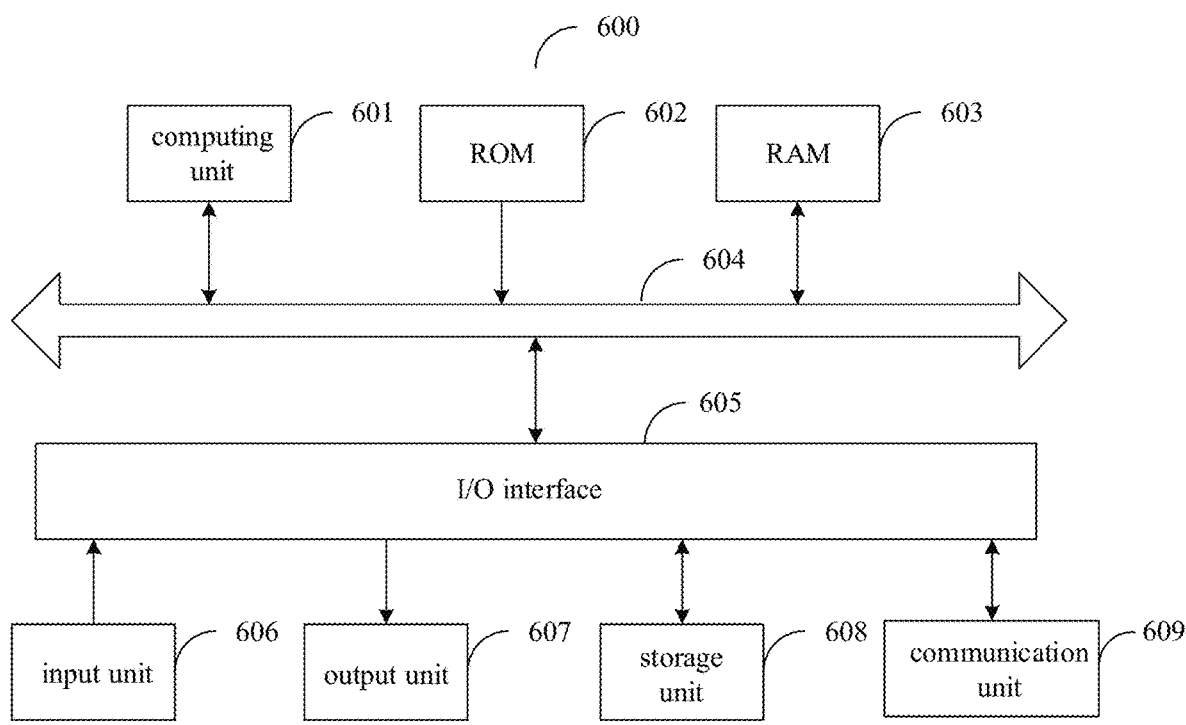
FIG. 6 is a block diagram of an electronic device 600 according to an embodiment of the present disclosure.

Referring to FIG. 6, which is a block diagram illustrating an electronic device 600 according to an embodiment of the present disclosure. The electronic device is intended to represent various types of digital computers, such as laptop computers, desktop computers, workstations, personal digital assistants, servers, blade servers, mainframe computers, and other suitable computers. The electronic device may also represent various types of mobile apparatuses, such as personal digital assistants, cellular phones, smart phones, wearable non-intrusive flexible loads aggregation characteristic identification devices, and other similar computing devices. The components shown herein, their connections and relations, and their functions are merely examples, and are not intended to limit the implementation of the disclosure described and/or required herein.

As shown in FIG. 6, the device 600 includes a computing unit 601, configured to execute various appropriate actions and processes according to a computer program stored in a read-only memory (ROM) 602 or loaded from a storage unit 608 to a random access memory (RAM) 603. In the RAM 603, various programs and data required for the device 600 may be stored. The computing unit 601, the ROM 602 and the RAM 603 may be connected with each other by a bus 604. An input/output (I/O) interface 605 is also connected to the bus 604.

Various component of the device 600 are connected to the I/O interface 605, and include: an input unit 606, such as, a keyboard, a mouse, etc.; an output unit 607, such as, various types of displays, speakers, etc.; a storage unit 608, such as, a magnetic disk, an optical disk, etc.; and a communication unit 609, such as, a network card, a modem, a wireless transceiver, etc. The communication unit 609 allows the device 600 to exchange information/data with other devices through a computer network, such as internet, and/or various types of telecommunication networks.

The computing unit 601 may be various types of general and/or dedicated processing components with processing and computing ability. Some examples of a computing unit 601 include but are not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 601 executes various methods and processes as described above, for example, a method for redirecting an edge node for a client. For example, in some embodiments, the method for redirecting an edge node for a client may be further implemented as a computer software program, which is physically contained in a machine readable medium, such as the storage unit 608. In some embodiments, a part or all of the computer program may be loaded and/or installed on the device 600 via the ROM 602 and/or a communication unit 609. When the computer program is loaded on the RAM 603 and executed by the computing unit 601, one or more steps in the methods for redirecting an edge node for a client as described above may be performed. Alternatively, in other embodiments, the computing unit 601 may be configured to perform the methods for redirecting an edge node for a client in other appropriate ways, for example, by virtue of a firmware.

Various implementation modes of systems and technologies described herein may be implemented in a digital electronic circuit system, an integrated circuit system, a field programmable gate array (FPGA), a dedicated application specific integrated circuit (ASIC), an application specific standard part (ASSP), a system on a chip (SOC), a complex programmable logic device (CPLD), a computer hardware, a firmware, a software, and/or their combinations. The implementations may include: being implemented in one or more computer programs. The one or more computer programs may be executed and/or interpreted on a programmable system including at least one programmable processor. The programmable processor may be a dedicated or general-purpose programmable processor, may receive data and instructions from a storage system, at least one input device, and at least one output device, and transmit the data and the instructions to the storage system, the at least one input device, and the at least one output device.

A computer code configured to execute methods in the present disclosure may be written with one or any combination of multiple programming languages. These programming languages may be provided to a processor or a controller of a general-purpose computer, a dedicated computer, or other programmable apparatuses for data processing, so that the function/operation specified in the flowchart and/or block diagram may be performed when the program code is executed by the processor or controller. A computer code may be executed completely or partly on the machine, as an independent software package that is executed partly on the machine and executed partly on the remote machine, or that is executed completely on the remote machine or server.

In the embodiments of the present disclosure, a machine-readable medium may be a tangible medium that may contain or store a program intended for use in or in conjunction with an instruction execution system, an apparatus or a device. The machine-readable medium may be a machine-readable signal medium or a machine-readable storage medium. The machine-readable medium may include but not limited to an electronic, magnetic, optical, electromagnetic, infrared, or semiconductor system, apparatus or device, or any of their appropriate combinations. A more specific example of the machine readable storage medium includes an electronic connector with one or more cables, a portable computer disk, a hardware, a random access memory (RAM), a read-only memory (ROM), an erasable programmable read-only memory (EPROM or a flash memory), an optical fiber device, and a compact disc read-only memory (CD-ROM), an optical storage device, a magnetic storage device, or any of their appropriate combinations.

In order to provide interaction with the user, the systems and technologies described here may be implemented on a computer, and the computer has: a display apparatus for displaying information to the user, for example, a cathode ray tube (CRT) or a liquid crystal display (LCD) monitor; and a keyboard and a pointing apparatus, for example, a mouse or a trackball, through which the user may provide input to the computer. Other types of apparatuses may further be configured to provide interaction with the user; for example, the feedback provided to the user may be any form of sensory feedback, for example, visual feedback, auditory feedback, or tactile feedback; and input from the user may be received in any form, including an acoustic input, a voice input or a tactile input.

Systems and technologies described herein may be implemented in a computing system, for example, as a data server, including a background component, or a computing system, for example, an application server, including a middleware component, or a computing system including a front-end component, for example, a user computer with a graphical user interface or a web browser, and the user may interact with implementations of the systems and technologies described herein via the graphical user interface or the web browser, or in a computing system including any combination of the background component, the middleware component, or the front-end component. Components of the system may be interconnected by any form or medium of digital data communication, for example, a communication network. Examples of the communication network include a local area network (LAN), a wide area network (WAN), and an Internet.

The computer system may include a client and a server. The client and the server are generally far away from each other and generally interact with each other through a communication network. The relationship between the client and the server is generated by computer programs that run on the corresponding computer and have a client-server relationship with each other. A server may be a cloud server, or a server with a distributed system, or a server in combination with a blockchain.

It should be noted that various forms of processes shown above may be used to reorder, add, or delete steps. For example, steps described in the present disclosure may be executed in parallel, sequentially, or in a different order, as long as the desired result of the technical solution disclosed in the present disclosure may be achieved, which will not be limited in the present disclosure.

The above implementations do not constitute a limitation of the protection scope of the disclosure. Those skilled in the art shall understand that various modifications, combinations and sub-combinations and substitutions may be made. Any modification, equivalent substitution and improvement, etc., made within the spirit and principle of the present disclosure shall be included within the protection scope of the present disclosure.

What is claimed is:

1. A method for redirecting an edge node for a client, comprising:
    determining a peak bandwidth of a target region based on peak bandwidths of edge nodes in the target region, wherein there are at least two edge nodes in the target region;
    determining a bandwidth ratio of each edge node based on the peak bandwidth of the target region and peak bandwidth of each edge node;
    obtaining a hash value of a data request address of a client request data by calculating the data request address using a preset algorithm; and
    determining one target edge node as an edge node of the client request data from the edge nodes of the target region based on the hash value and the bandwidth ratio of each edge node.

2. The method according to claim 1, wherein the target region comprises at least two sub regions, and the client is located in a first sub region of the sub regions, and the data request address of the client request data is directed to an edge node in the first sub region.

3. The method according to claim 2, wherein before determining the peak bandwidth of the target region based on the peak bandwidths of the edge nodes in the target region, the method further comprises:
    determining the edge nodes in the target region based on edge nodes in the sub regions.

4. The method according to claim 3, wherein in a case that the different sub regions contain same edge nodes, the method further comprises:
    merging the different sub regions into a same target region, or
    in a case that a distance between geographic locations of the different sub regions is less than a preset distance threshold, the method further comprises:
    merging the different sub regions into a same target region.

5. The method according to claim 1, wherein before determining the peak bandwidth of the target region based on the peak bandwidths of the edge nodes in the target region, the method further comprises:
    obtaining an available bandwidth, a remaining processor-supportable bandwidth, and a remaining memory-supportable bandwidth of each edge node; and
    taking one of the available bandwidth, the remaining processor-supportable bandwidth, or the remaining memory-supportable bandwidth of each edge node that has the smallest difference with a preset distance threshold as the peak bandwidth of each edge node.

6. The method according to claim 1, wherein determining one target edge node as the edge node of the client request data from the edge nodes of the target region based on the hash value and the bandwidth ratio of each edge node, comprises:
    sorting the edge nodes based on the bandwidth ratio of each edge node; and
    determining one target edge node as the edge node of the client request data from the edge nodes of the target region based on the hash value and the sorting result.

7. The method according to claim 1, further comprising:
    obtaining an operation state of the target edge node according to a first preset frequency;
    updating the target region where the target edge node is located in a case that the operation state is abnormal; and
    recalculating the updated target region to re-determine one target edge node as the edge node of the client request data.

8. The method according to claim 7, wherein the updating the target region comprises:
    removing an abnormal target edge node from the target region, or
    replacing the abnormal target edge node in the target region with a new edge node.

9. The method according to claim 1, wherein determining one target edge node as the edge node of the client request data from the edge nodes of the target region based on the hash value and the bandwidth ratio of each edge node, comprises:

determining one target edge node as the edge node of the client request data from the edge nodes of the target region, based on a remainder obtained by dividing the hash value by a preset threshold and the bandwidth ratio of each edge node.

10. The method according to claim 1, wherein the preset algorithm comprises at least one of: a cyclic redundancy check algorithm, a hash function algorithm, or a hash function derived algorithm.

11. A non-transitory computer-readable storage medium, storing computer instructions, wherein the computer instructions are configured to cause a computer to perform a method for redirecting an edge node for a client, the method comprising:
    determining a peak bandwidth of a target region based on peak bandwidths of edge nodes in the target region, wherein there are at least two edge nodes in the target region;
    determining a bandwidth ratio of each edge node based on the peak bandwidth of the target region and peak bandwidth of each edge node;
    obtaining a hash value of a data request address of a client request data by calculating the data request address using a preset algorithm; and
    determining one target edge node as an edge node of the client request data from the edge nodes of the target region based on the hash value and the bandwidth ratio of each edge node.

12. An electronic device, comprising: at least one processor; and a memory communicatively coupled to the at least one processor and storing instructions executable by the at least one processor;
    wherein the at least one processor is configured to:
    determine a peak bandwidth of a target region based on peak bandwidths of edge nodes in the target region, wherein there are at least two edge nodes in the target region;
    determine a bandwidth ratio of each edge node based on the peak bandwidth of the target region and peak bandwidth of each edge node;
    obtain a hash value of a data request address of a client request data by calculating the data request address using a preset algorithm; and
    determine one target edge node as an edge node of the client request data from the edge nodes of the target region based on the hash value and the bandwidth ratio of each edge node.

13. The device according to claim 12, wherein the target region comprises at least two sub regions, and the client is located in a first sub region of the sub regions, and the data request address of the client request data is directed to an edge node in the first sub region.

14. The device according to claim 13, wherein before determining the peak bandwidth of the target region based on the peak bandwidths of the edge nodes in the target region, the at least one processor is further configured to:
    determine the edge nodes in the target region based on edge nodes in the sub regions.

15. The device according to claim 14, wherein
    in a case that the different sub regions contain same edge nodes, the at least one processor is further configured to merge the different sub regions into a same target region;
    or
    in a case that a distance between geographic locations of the different sub regions is less than a preset distance threshold, the at least one processor is further configured to merge the different sub regions into a same target region.

16. The device according to claim 12, wherein before determining the peak bandwidth of the target region based on the peak bandwidths of the edge nodes in the target region, the at least one processor is further configured to:
    obtain an available bandwidth, a remaining processor-supportable bandwidth, and a remaining memory-supportable bandwidth of each edge node; and
    take one of the available bandwidth, the remaining processor-supportable bandwidth, or the remaining memory-supportable bandwidth of each edge node that has the smallest difference with a preset distance threshold as the peak bandwidth of each edge node.

17. The device according to claim 12, wherein the at least one processor is further configured to:
    sort the edge nodes based on the bandwidth ratio of each edge node; and
    determine one target edge node as the edge node of the client request data from the edge nodes of the target region based on the hash value and the sorting result.

18. The device according to claim 12, wherein the at least one processor is further configured to:
    obtain an operation state of the target edge node according to a first preset frequency;
    update the target region where the target edge node is located in a case that the operation state is abnormal; and
    recalculate the updated target region to re-determine one target edge node as the edge node of the client request data,
    wherein the updating the target region comprises:
    removing an abnormal target edge node from the target region, or
    replacing the abnormal target edge node in the target region with a new edge node.

19. The device according to claim 12, wherein the at least one processor is further configured to:
    determine one target edge node as the edge node of the client request data from the edge nodes of the target region, based on a remainder obtained by dividing the hash value by a preset threshold and the bandwidth ratio of each edge node.

20. The device according to claim 12, wherein the preset algorithm comprises at least one of: a cyclic redundancy check algorithm, a hash function algorithm, or a hash function derived algorithm.

* * * * *